(12) United States Patent
Wakeham et al.

(10) Patent No.: US 11,547,004 B2
(45) Date of Patent: Jan. 3, 2023

(54) BICYCLE COMPONENT MADE OF COMPOSITE MATERIAL AND RELATED MANUFACTURING PROCESS

(71) Applicant: Campagnolo S.r.l., Vicenza (IT)

(72) Inventors: Keith Joseph Wakeham, Calgary (CA); Fabiano Fossato, Campagna Lupia (IT); Mauri Feltrin, Nanto (IT)

(73) Assignee: Campagnolo S.r.l., Vicenza (IT)

( * ) Notice: Subject to any disclaimer, the term of this patent is extended or adjusted under 35 U.S.C. 154(b) by 38 days.

(21) Appl. No.: 16/407,470

(22) Filed: May 9, 2019

(65) Prior Publication Data

US 2019/0344514 A1  Nov. 14, 2019

(30) Foreign Application Priority Data

May 11, 2018   (IT) .................. 102018000005294

(51) Int. Cl.
   *H05K 5/02*   (2006.01)
(52) U.S. Cl.
   CPC ..................................... *H05K 5/02* (2013.01)
(58) Field of Classification Search
   CPC .......... B62K 21/12; H05K 3/284; H05K 5/02; H05K 5/03
   See application file for complete search history.

(56) References Cited

U.S. PATENT DOCUMENTS

| 5,016,478 | A | 5/1991 | Mercat |
| 5,027,303 | A | 6/1991 | Witte |
| 5,319,522 | A | 6/1994 | Mehta |
| 5,613,407 | A | 3/1997 | Ogata |
| 6,296,072 | B1 | 10/2001 | Turner |
| 6,321,734 | B1* | 11/2001 | Kaminaga ............. H01L 21/563 123/634 |
| 7,647,837 | B2 | 1/2010 | Moran et al. |
| 8,006,574 | B2 | 8/2011 | Meyer |
| 8,065,926 | B2 | 11/2011 | Meyer |
| 8,096,173 | B2 | 1/2012 | Isono |
| 8,800,389 | B2 | 8/2014 | Tetsuka |
| 8,852,130 | B2 | 10/2014 | Govari |
| 8,881,608 | B2 | 11/2014 | Tetsuka |
| 9,097,598 | B2 | 8/2015 | Grassi |

(Continued)

FOREIGN PATENT DOCUMENTS

| CN | 1724307 A | 1/2006 |
| CN | 1753950 A2 | 3/2006 |

(Continued)

OTHER PUBLICATIONS

STIC Search (Year: 2022).*

(Continued)

*Primary Examiner* — Hung S. Bui
*Assistant Examiner* — Sagar Shrestha
(74) *Attorney, Agent, or Firm* — Volpe Koenig

(57) ABSTRACT

A process for manufacturing a bicycle component and a bicycle component manufactured by the process. The process includes protecting a printed circuit board, inserting the protected printed circuit board into the mold cavity, inserting a composite material into the mold cavity so it is around and in contact with the circuit board, and subjecting the mold cavity to a temperature and pressure profile until the composite material hardens.

11 Claims, 9 Drawing Sheets

(56) References Cited

U.S. PATENT DOCUMENTS

| | | | |
|---|---|---|---|
| 9,182,304 B2 | 11/2015 | Namiki et al. | |
| 9,221,440 B2 | 12/2015 | Drennen | |
| 9,254,588 B1* | 2/2016 | Chao | H01L 21/565 |
| 9,310,264 B2 | 4/2016 | David | |
| 9,322,725 B2 | 4/2016 | Tetsuka | |
| 9,423,310 B2 | 8/2016 | Tetsuka | |
| 9,459,167 B2 | 10/2016 | Heinkel et al. | |
| 9,476,294 B2 | 10/2016 | Harman | |
| 9,488,668 B2 | 11/2016 | Bailey et al. | |
| 9,551,623 B2 | 1/2017 | Beirmann | |
| 9,581,508 B2 | 2/2017 | Tetsuka | |
| 9,599,526 B2 | 3/2017 | Mercat | |
| 9,784,628 B1 | 10/2017 | Jennings et al. | |
| 9,810,593 B2 | 11/2017 | Carrasco | |
| 9,829,402 B2 | 11/2017 | Beason et al. | |
| 9,969,451 B2 | 5/2018 | Sasaki | |
| 10,000,253 B1 | 6/2018 | Tetsuka | |
| 10,076,681 B2 | 9/2018 | Lull | |
| 10,286,978 B1 | 5/2019 | Chen | |
| 10,591,371 B2 | 3/2020 | D'Elia | |
| 2003/0093173 A1 | 5/2003 | Farnworth et al. | |
| 2003/0137046 A1* | 7/2003 | Kageyama | H01L 23/13 257/704 |
| 2005/0145061 A1 | 7/2005 | Ording et al. | |
| 2005/0199092 A1 | 9/2005 | Feltrin et al. | |
| 2007/0186719 A1 | 8/2007 | Ciavatta et al. | |
| 2007/0199403 A1* | 8/2007 | Ciavatta | F16C 3/22 74/594.1 |
| 2007/0231955 A1* | 10/2007 | Liu | B29C 45/561 438/106 |
| 2008/0236293 A1 | 10/2008 | Meggiolan | |
| 2008/0257056 A1 | 10/2008 | Smetana | |
| 2008/0314193 A1 | 12/2008 | Meggiolan | |
| 2009/0119032 A1* | 5/2009 | Meyer | B62J 45/421 702/44 |
| 2009/0120210 A1 | 5/2009 | Phillips et al. | |
| 2010/0162830 A1 | 7/2010 | Meuter | |
| 2010/0220963 A1* | 9/2010 | Tamura | G02B 6/4292 385/88 |
| 2010/0242273 A1* | 9/2010 | Sugimoto | H05K 3/3415 29/841 |
| 2010/0263468 A1 | 10/2010 | Fisher et al. | |
| 2011/0135474 A1 | 6/2011 | Thulke | |
| 2012/0169154 A1* | 7/2012 | Curodeau | B60L 15/20 310/43 |
| 2012/0214646 A1 | 8/2012 | Lull et al. | |
| 2012/0330572 A1* | 12/2012 | Longman | B62M 3/00 702/44 |
| 2013/0047723 A1 | 2/2013 | Tacx | |
| 2013/0205916 A1 | 8/2013 | Kodama et al. | |
| 2013/0283969 A1 | 10/2013 | Watarai | |
| 2013/0333489 A1 | 12/2013 | David et al. | |
| 2014/0060212 A1 | 3/2014 | Tetsuka et al. | |
| 2014/0200835 A1 | 7/2014 | Carrasco Vergara | |
| 2015/0239499 A1 | 8/2015 | Lan et al. | |
| 2015/0247767 A1 | 9/2015 | Tetsuka | |
| 2016/0003696 A1 | 1/2016 | Longman et al. | |
| 2016/0031523 A1 | 2/2016 | Tetsuka et al. | |
| 2016/0052583 A1 | 2/2016 | Sasaki | |
| 2016/0295702 A1* | 10/2016 | Heikkinen | H05K 3/12 |
| 2016/0311491 A1 | 10/2016 | Watarai | |
| 2017/0127581 A1* | 5/2017 | Figueredo | H01L 23/552 |
| 2017/0176275 A1 | 6/2017 | Tetsuka et al. | |
| 2017/0232674 A1* | 8/2017 | Mark | B29C 31/042 264/308 |
| 2017/0247078 A1 | 8/2017 | Tetsuka | |
| 2017/0248420 A1 | 8/2017 | Fyfe et al. | |
| 2017/0271722 A1* | 9/2017 | Ehm | H01M 10/486 |
| 2017/0356816 A1 | 12/2017 | D'Elia et al. | |
| 2018/0011122 A1 | 1/2018 | Nichols et al. | |
| 2018/0290714 A1 | 10/2018 | Fossato et al. | |
| 2019/0099119 A1 | 4/2019 | Wakeham | |
| 2019/0320539 A1* | 10/2019 | Moeller | H01G 9/26 |
| 2020/0180353 A1* | 6/2020 | Clark | B32B 27/36 |

FOREIGN PATENT DOCUMENTS

| | | |
|---|---|---|
| CN | 101201284 A | 6/2008 |
| CN | 101290026 A | 10/2008 |
| CN | 101327828 A | 12/2008 |
| CN | 201201674 Y | 3/2009 |
| CN | 201707167 U | 1/2011 |
| CN | 102589772 A | 7/2012 |
| CN | 103612702 A | 3/2014 |
| CN | 103674384 A | 3/2014 |
| CN | 204527067 U | 8/2015 |
| CN | 205156906 U | 4/2016 |
| CN | 205352592 U | 6/2016 |
| CN | 106003753 A | 10/2016 |
| CN | 106335591 A | 1/2017 |
| CN | 205971719 U | 2/2017 |
| CN | 106965901 A | 7/2017 |
| CN | 107290086 A | 10/2017 |
| CN | 107585252 A | 1/2018 |
| CN | 207019821 U | 2/2018 |
| EP | 1 486 413 A2 | 12/2004 |
| EP | 1 818 252 A1 | 8/2007 |
| EP | 1 978 342 A2 | 10/2008 |
| EP | 1 407 239 B1 | 1/2009 |
| EP | 2 058 637 A2 | 5/2009 |
| EP | 2213438 A1 | 8/2010 |
| EP | 2805141 B1 | 11/2014 |
| JP | H08145824 A | 6/1996 |
| TW | M445546 U | 1/2013 |
| TW | 201307145 A | 2/2013 |
| TW | 201336738 A | 9/2013 |
| TW | 201615477 A | 5/2016 |
| WO | 2011/030215 A1 | 3/2011 |
| WO | 2014009381 A1 | 1/2014 |
| WO | 2015022687 A1 | 2/2015 |
| WO | 2015/095933 A1 | 7/2015 |
| WO | 2016/030859 A1 | 3/2016 |
| WO | 2017/165448 A1 | 9/2017 |

OTHER PUBLICATIONS

Italian Search Report and Written Opinion in Italian Application No. 102018000005294, dated Jan. 15, 2019, with English translation.
Italian Search Report and Written Opinion in Italian Application No. 102018000005297, dated Mar. 4, 2019, with English translation.
Italian Search Report and Written Opinion in Italian Application No. 102018000005299, dated Jan. 21, 2019, with English translation.
Italian Search Report and Written Opinion in Italian Application No. 102018000005302, dated Jan. 23, 2019, with English translation.
Italian Search Report and Written Opinion in Italian Application No. 102018000007266, dated Mar. 22, 2019, with English translation.
Ron/Spinningmagnets; "Electric bicycles are adopting a new standard for connectors: electricbike.com"; published on Dec. 6, 2013. Retrieved from the Internet: URL: https://www.electricbike.com/ropdenergybus-charging-port-standard/ (accessed on May 3, 2019).
Chinese Office Action for Application No. 201910389220.0, dated Aug. 11, 2021, with English translation.
Chinese Office Action for Application No. 201910388132.9, dated Aug. 17, 2021, with English translation.
Chinese Office Acton for Application No. 201910388492.9, dated Jan. 12, 2022. English translation attached.
Chinese Office Action for Application No. 201910389220.0, dated Jan. 21, 2022. English translation attached.
Chinese Office Action for Chinese Application No. 201910388132.9, dated Mar. 28, 2022 English translation attached.
Chinese Notification of Grant dated Jul. 20, 2022 for Chinese Patent Application No. 201910389220.0.
Taiwanese Office Action dated Jul. 19, 2022 for Taiwan Patent Application No. 108115487.
Taiwanese Office Action and Search Report dated Aug. 23, 2022 for Taiwan Patent Application No. 108115485.
Internet Literature Ron/Spinningmagnets Rosenberger "Charge Connectors Make Ebike Charging Cooler than Ever" electricbike.com Dec. 7, 2013 (attached hereto is a word file showing the contents of the web page: https://www.electricbike.com/ropdenergybus-charging-port-standard/).

(56) References Cited

OTHER PUBLICATIONS

Taiwanese Office Action and Search Report dated Sep. 5, 2022 for Taiwan Patent Application No. 108115376.

* cited by examiner

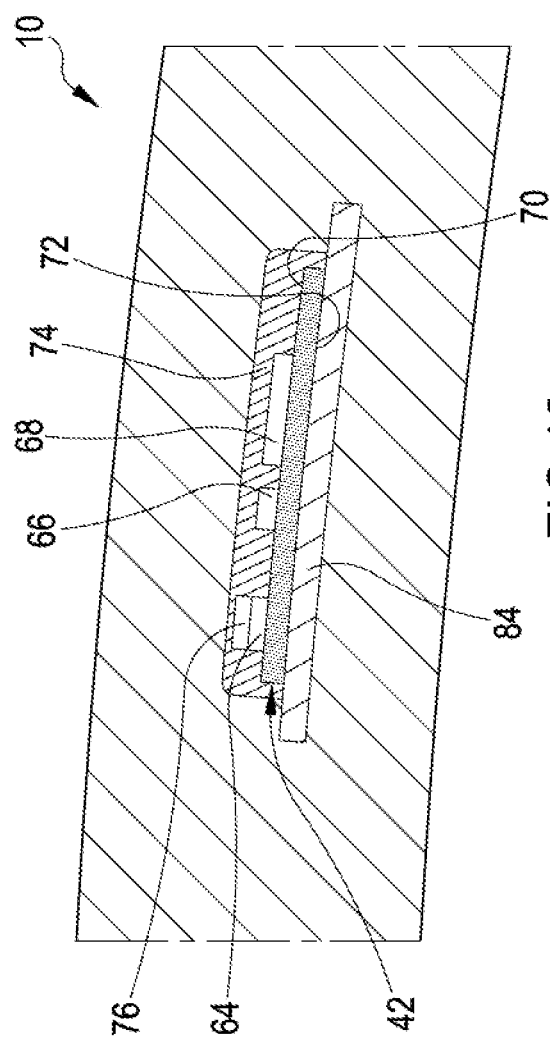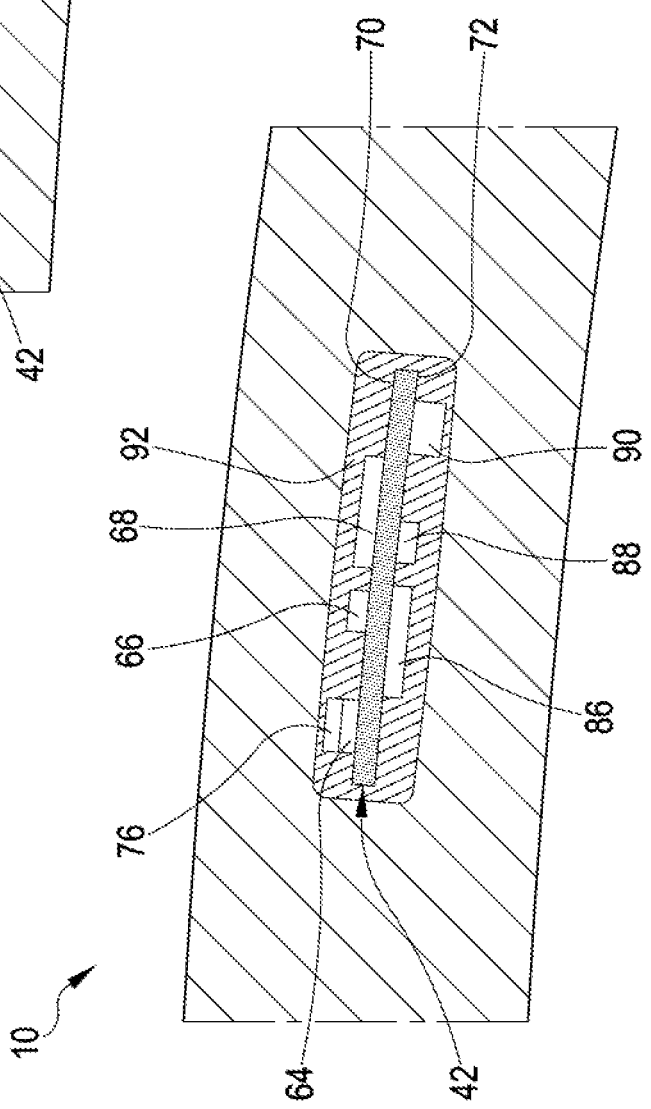

BICYCLE COMPONENT MADE OF COMPOSITE MATERIAL AND RELATED MANUFACTURING PROCESS

CROSS REFERENCE TO RELATED APPLICATION

This application claims the benefit of Italian Application No. 102018000005294, filed on May 11, 2018, which is incorporated herein by reference as if fully set forth.

FIELD OF INVENTION

The invention relates in general to the field of bicycles. More particularly, as bicycles are increasingly equipped with electrical/electronic systems, which are often housed on printed circuit boards (PCB), there are problems of where to arrange the boards and of how to fix them to a component of the bicycle.

BACKGROUND

US2016/0031523 A1 discloses a crankarm with a force measurement apparatus, wherein a printed circuit board of the force measurement apparatus is housed in a housing attached externally to the outer face of the crankarm.

U.S. Pat. No. 9,459,167B2 discloses a crankset with a power measuring device, wherein a printed circuit board of the power measuring device is housed in a housing housed in the bottom bracket shaft.

EP1818252A1 discloses a method for manufacturing a bicycle pedal crank, comprising the steps of winding a composite material around a core consisting of a metallic material having low melting point, moulding the composite material and, after moulding, forming at least one hole on a surface of said pedal crank and heating the crankarm up to the melting point of said metallic material having low melting point to allow it to flow out.

U.S. Pat. No. 9,488,668B2 discloses a crank equipped with a compartment and a printed circuit board inserted from the outside into the compartment.

US 2016/0003696A1 discloses a crankarm with a power meter, wherein a printed circuit board of the power meter is housed in a cavity opening at an external surface of the crankarm.

U.S. Pat. No. 8,006,574B2 discloses a similar crankarm, wherein a material that acts as mechanical protection can be applied to fill in the pocket and possibly subsequently moulded.

With regard to such documents, the Applicant has observed that making such recesses weakens the crankarm.

SUMMARY

The technical problem at the basis of the invention is that of providing higher integration of a printed circuit board in a bicycle component, in particular in a crankarm. The solution is a bicycle component having structural fiber incorporated in a polymeric matrix and co-molded with a printed circuit board. The composite material extends around and in contact with the printed circuit board.

BRIEF DESCRIPTION OF THE DRAWINGS

Further features and advantages of the invention will be more clearly apparent from the description of preferred embodiments thereof, made with reference to the attached drawings, wherein:

FIGS. 12-13 are partial sectional views of a bicycle component having a solid section, in particular of a solid crankarm, according to some embodiments of the invention.

DETAILED DESCRIPTION OF THE PREFERRED EMBODIMENTS

Figure 1:
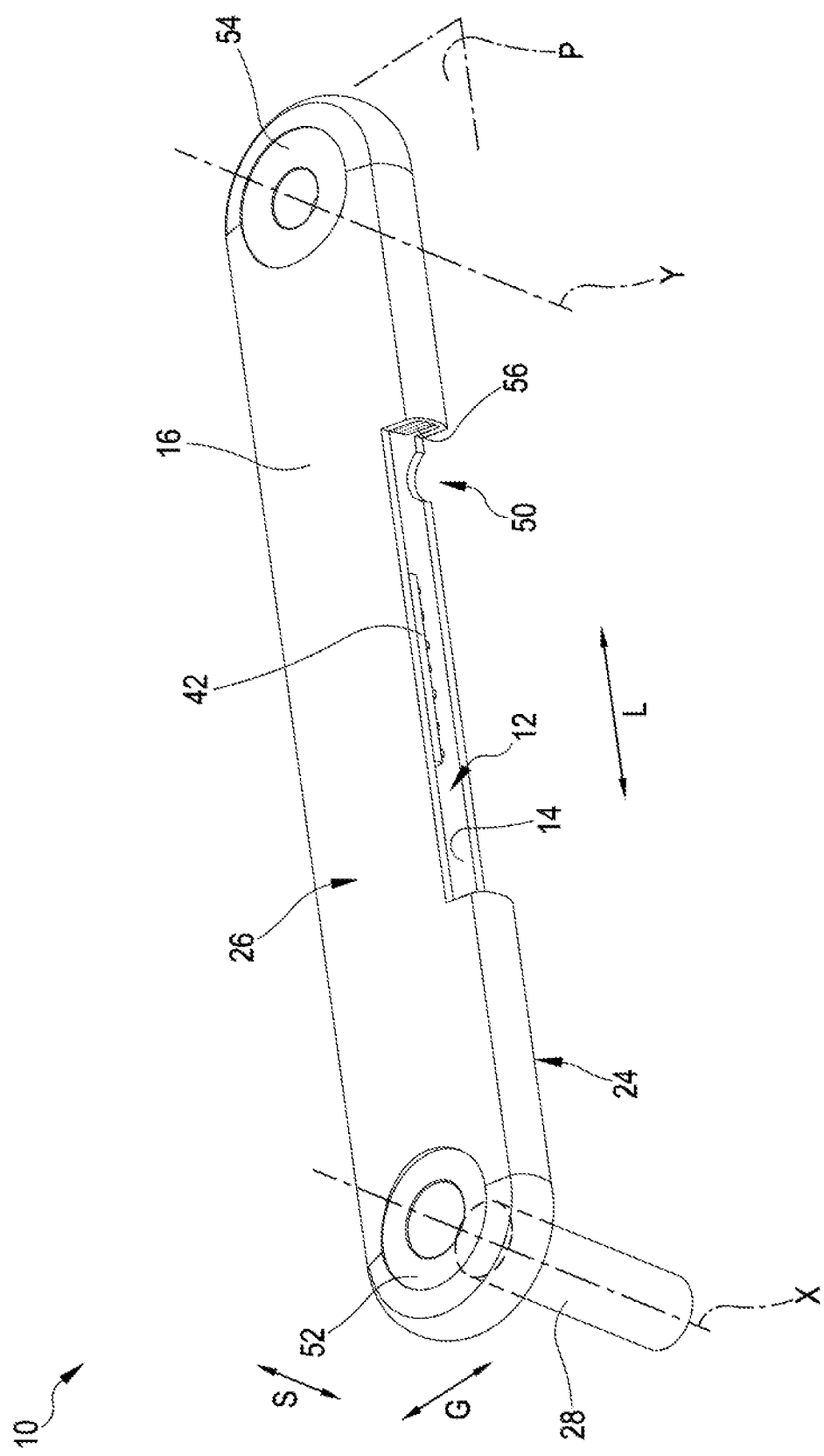
FIG. 1 schematically illustrates a bicycle component, in particular a crankarm, partially broken away.

In one aspect the invention relates to a process for manufacturing a bicycle component made of composite material comprising structural fiber incorporated in a polymeric matrix, comprising the steps, not necessarily sequential to each other, of:

providing a mold having a mold cavity having the shape of the bicycle component, providing a printed circuit board, providing at least one first face of the printed circuit board with a protection, inserting the printed circuit board provided with the protection into said mold cavity, inserting said composite material into said mold cavity, with the proviso that said composite material extends all around said printed circuit board provided with the protection, said composite material being in contact with said printed circuit board provided with the protection on the side of said first face and/or on the opposite side, and subjecting to a temperature and pressure profile until hardening of the composite material.

In the present description and in the attached claims, the expression "harden" is meant to be broadly understood not only to indicate the setting of thermoplastic polymers, but to also encompass the cross-linking of thermosetting or light-curable polymers.

The provision of suitably protecting the printed circuit board allows it to be co-molded inside the bicycle component; by co-molding the printed circuit board inside the component made of composite material, it is well protected against dirt, water, etc.; furthermore, this provision allows the bicycle component to be given a better appearance.

In the present description and in the attached claims, under the expression "co-molding" and derivatives, is meant to be indicated that the bicycle component is molded, as a single piece, with the printed circuit board and/or other non-polymeric—for example metallic—elements already inserted inside it; co-cross-linking may or may not take place among the co-molded elements.

The protection of the invention can perform different tasks, alternately or simultaneously.

As far as the conductive tracks and/or the pads of the printed circuit board are concerned, the protection performs the task of electrically insulating them, especially in case the face (or the faces) on which they are formed is (are) in contact with conductive material, like for example composite material comprising carbon fiber.

As far as the electrical/electronic component(s) is/are concerned, the protection performs the task of protecting it or them against the pressures and/or temperatures of molding and/or of other processing steps, in case theses are critical—like in particular in the case of compression molding of thermosetting polymeric material.

In both cases, the protection can also perform the task of protecting against chemical agents.

Preferably at least one first face of the printed circuit board carries at least one electrical/electronic component and, in the step of providing with protection, the protection is a protection against a critical temperature and/or a critical pressure for said at least one electrical/electronic component.

In particular, said critical temperature can be a temperature of 135° C.-140° C. reached during the molding process or even a temperature of 150° C.-160° C. and beyond reached during a melting step of a core used during the process for manufacturing a hollow bicycle component.

Said critical pressure can be a pressure of 300 bar reached during the molding process.

Preferably, the step of providing with protection comprises providing a layer of a polymeric material on said at least one first face of said printed circuit board, and preferably hardening or letting said polymeric material harden before said step of subjecting to the temperature and pressure profile.

The polymeric material is selected among a thermosetting polymer, a thermoplastic polymer and a light-curable polymer, preferably not requiring a compression or injection molding process.

Preferably, the polymeric material is based on a thermosetting epoxy resin, preferably a bi-component one. Alternatively, the polymeric material can be methacrylate, polyurethane, or an acrylic material.

Preferably, said at least one first face of the printed circuit board carries a plurality of electrical/electronic components, and the step of providing the layer of polymeric material comprises filling the spaces between said electrical/electronic components with the polymeric material.

In this way, advantageously, the protection provides a uniform surface onto which the molding pressure is evenly distributed.

Preferably, in said step of providing with protection, said protection is an electrically insulating protection, alternatively or additionally to being a protection against a critical temperature and/or a critical pressure.

Said electrically insulating protection can be formed of said polymeric material, in particular when said at least one face carries at least one electrical/electronic component.

Alternatively or additionally, the electrically insulating protection can comprise a layer, in particular at least one ply, of composite material comprising insulating fiber, preferably glass fiber, in particular when said at least one face carries tracks and/or electrical connection pads.

Alternatively to the glass fiber composite material it is possible to use other electrically insulating materials, having analogous or similar properties, like for example thermoplastic fibers, for example nylon-based fibers or fibers of the Dyneema® type, basalt-based mineral fibers, aramid fibers or Zylon®.

Preferably, the composite material comprising insulating fiber has a polymeric matrix equal to or at least compatible with the polymeric matrix of the composite material of the bicycle component, in terms of polymerization or hardening pressure and temperature profile.

Alternatively or additionally to the aforementioned protections, when said at least one first face of said printed circuit board carries at least one electrical/electronic component, the step of providing with protection can comprise covering said at least one first face with a cover or a framework, containing said at least one electrical/electronic component.

When said at least one first face of said printed circuit board carries at least one fragile electrical/electronic component, the process can comprise the step of coating said at least one fragile component with a layer of dampening material, carried out before said step of providing the layer of polymeric material.

In the present description and in the attached claims, under "fragile component" a component that would be damaged at a pressure comprised within the pressure profile used during the hardening cycle of the polymeric material is meant to be indicated.

Preferably, the dampening material is selected among silicone and polyurethane.

Preferably, the fragile component is an accelerometer.

Preferably, the process further comprises the step of providing a core of a predetermined shape, applying said printed circuit board provided with the protection onto the core, and coating with the composite material said core, having said printed circuit board applied thereto, so as to create a bicycle component in which the composite material is in the form of a shell or cladding.

The core can stay in the molded bicycle component, but preferably the core is made of low melting point material, and the process comprises the step, carried out after hardening has taken place, of making a hole in the bicycle component, heating up to a temperature above the melting point of the core material, and letting the molten core come out through the hole.

Preferably, if the core is made of low melting point material, the process further comprises a step of washing the cavity left by the molten core with a chemical agent, and in said step of providing with protection, said protection is a protection against said chemical agent.

Preferably, said core comprises at least one recess, and in said step of applying on the core said printed circuit board having the protection, said printed circuit board is applied in said recess.

This provision prevents the board from moving during the molding process, and reduces the pressure acting on the printed circuit board.

A core having one or more recesses in which a printed circuit board or other electrical/electronic components can be applied is a provision that is per se useful and represents an innovative aspect per se, independently of the provision of the printed circuit board co-molded in the bicycle component.

Preferably, the printed circuit board is applied in said recess with a face thereof carrying electrical/electronic components facing towards the recess.

More preferably, the polymeric material is subsequently injected into the recess, and hardened or let harden there.

Alternatively to the use of the core, the process can comprise the step of completely wrapping the printed circuit board provided with protection with the composite material, so that it is co-molded in a component having a solid section—at least in such a region.

In one aspect, the invention relates to a bicycle component obtained through a process having one or more of the features described above.

In another aspect, the invention relates to a monolithic bicycle component made of composite material comprising structural fiber incorporated in a polymeric matrix, co-molded with a printed circuit board provided with a protection on at least one first face thereof, wherein said composite material extends all around said printed circuit board provided with the protection, said composite material being in contact with said printed circuit board provided with the protection on the side of said first face and/or on the opposite side.

The printed circuit board is therefore completely enclosed by said composite material.

In the present description and in the attached claims, under "monolithic" component, an even complex structure, still made of parts joined together and not detachable from each other without damaging at least one of them, is meant to be indicated.

The advantages of such a bicycle component and the tasks performed by the protection, as well as the preferred features of the bicycle component, the associated advantages and the various alternatives and preferred embodiments correspond, mutatis mutandis and unless otherwise specified, to those described above with reference to the process.

Preferably, said at least one first face of said printed circuit board carries at least one electrical/electronic component and said protection is a protection against a critical temperature and/or a critical pressure for said at least one electrical/electronic component, the possible values of which have been indicated above.

Preferably, said protection comprises a layer of a hardened polymeric material.

Preferably, said at least one first face of said printed circuit board carries a plurality of electrical/electronic components, and said polymeric material fills the spaces between said electrical/electronic components.

Preferably, said protection is an electrically insulating protection, alternatively or additionally to being a protection against a critical temperature and/or a critical pressure.

Alternatively or additionally to the aforementioned protections, when said at least one first face of said printed circuit board carries at least one electrical/electronic component, said protection can comprise a cover or a framework that covers said at least one first face, and that contains said at least one electrical/electronic component.

When said at least one first face of said printed circuit board carries at least one fragile electrical/electronic component, said at least one fragile component is preferably coated with a layer of dampening material, underlying said layer of polymeric material, and for which what has been stated above holds valid.

The bicycle component can comprise at least one cavity.

In this case, the composite material is in the form of a shell or cladding surrounding the cavity.

Preferably, said printed circuit board provided with the protection is attached to an inner surface of the cavity (inner surface of the shell).

Alternatively, the bicycle component comprises a core.

In this case, the composite material is in the form of a shell or cladding surrounding the core.

Preferably, said printed circuit board provided with the protection is arranged between the core and the composite material (between the core and the shell).

Preferably, said core comprises at least one recess, and said printed circuit board provided with the protection is arranged within said recess.

Alternatively to the provision of a core or of a cavity, both faces of said printed circuit board provided with the protection can be in contact with the composite material. In this case, the section of the bicycle component is solid, at least in the region containing the printed circuit board.

In the various aspects of the invention, the bicycle component is selected from the group consisting of a crankarm, a handlebar and a control lever, and preferably it is a crankarm.

In another aspect, the invention relates to a process for manufacturing a bicycle component made of composite material comprising structural fiber incorporated in a polymeric matrix, comprising the steps, not necessarily sequential to each other, of:
- providing a mold having a mold cavity having the shape of the bicycle component,
- providing a printed circuit board carrying at least one electrical/electronic component on a first face thereof,
- coating at least said first face with a polymeric material,
- hardening or letting said polymeric material harden,
- inserting the coated board into said mold cavity,
- inserting said composite material into said mold cavity,
- subjecting to a temperature and pressure profile until hardening of the composite material.

Preferably, said composite material extends all around said coated printed circuit board, said composite material being in contact with said coated printed circuit board on the side of said first face and/or on the opposite side.

Other advantageous features of this process correspond to those described above.

In another aspect the invention relates to a bicycle component made of composite material comprising structural fiber incorporated in a polymeric matrix, comprising:
- a printed circuit board carrying at least one electrical/electronic component on a first face thereof,
- wherein at least said first face is coated with a hardened polymeric material,
- wherein at least one of said coated first face of the board and the opposite face is coated with said composite material.

Other advantageous features of this process correspond to those described above.

Preferably, said board is totally coated with said hardened polymeric material.

In one aspect, the invention relates to a core for manufacturing a hollow component of a bicycle, made of low melting point material, characterized by comprising at least one recess.

In the various aspects of the invention, preferably the bicycle component is a crankarm and said at least one electrical/electronic component forms part of a torque meter or of a power meter.

In the various aspects of the invention, preferably, the structural fiber is selected from the group consisting of carbon fibers, glass fibers, boron fibers, synthetic fibers, ceramic fibers and combinations thereof.

In the various aspects of the invention, preferably, the synthetic fibers comprise polyoxazole fibers, for example Zylon®, ultra high molecular weight polyethylene fibers, for example Dyneema®, aramid fibers, for example kevlar fibers, and combinations thereof.

A bicycle component according to the invention is made of composite material comprising structural fibers incorporated in a polymeric material.

Typically, the structural fiber is selected from the group consisting of carbon fibers, glass fibers, boron fibers, synthetic fibers, ceramic fibers and combinations thereof, carbon fibers being preferred.

Preferably, the synthetic fibers comprise polyoxazole fibers, for example Zylon®, ultra high molecular weight polyethylene fibers, for example Dyneema®, aramid fibers, for example kevlar fibers and combinations thereof.

Typically, the composite material is layered, and for each layer there is a vast choice of materials, in general known as Sheet Molding Compounds (SMCs).

However, the composite material could also not be layered.

By way of a non-limiting example, in the layered composite material, each layer can be selected, independently of the other layers, among a composite material with unidirectional fiber, with woven two-directional fiber, with non-woven two-directional fiber, with woven multi-directional fiber, with non-woven multi-directional fiber, with short or very short fiber having random orientation, with fiber conglomerates, and combinations thereof; as well as independently among a composite material with preimpregnated fiber ("prepreg") and a composite material with dry fiber, the polymeric matrix material being added during the molding process; as well as independently among a composite material with thermosetting polymeric matrix and a composite material with thermoplastic polymeric matrix; the choice in each group of alternatives being independent of the choice in each other group.

In the case of non-layered composite material, it can be selected among the various alternatives of each aforementioned group for the individual layers, but typically it is of the type with short or very short fiber having random orientation or with fiber conglomerates or combinations thereof.

In the layered composite material, each layer can comprise structural fibers oriented the same way or differently with respect to one or more other layers.

In a particularly preferred manner, the material used for manufacturing the bicycle component is a compound with preimpregnated fiber, and comprises a polymeric matrix of the thermosetting type.

Manufacturing the bicycle component from such a composite material with thermosetting polymeric matrix takes place through a compression molding process, while if the polymeric matrix is a thermoplastic one, it takes place through an injection molding process. Another process that can be used is thermoforming.

The following description is made with reference to a crankarm only by way of an example of a bicycle component.

Figure 2:
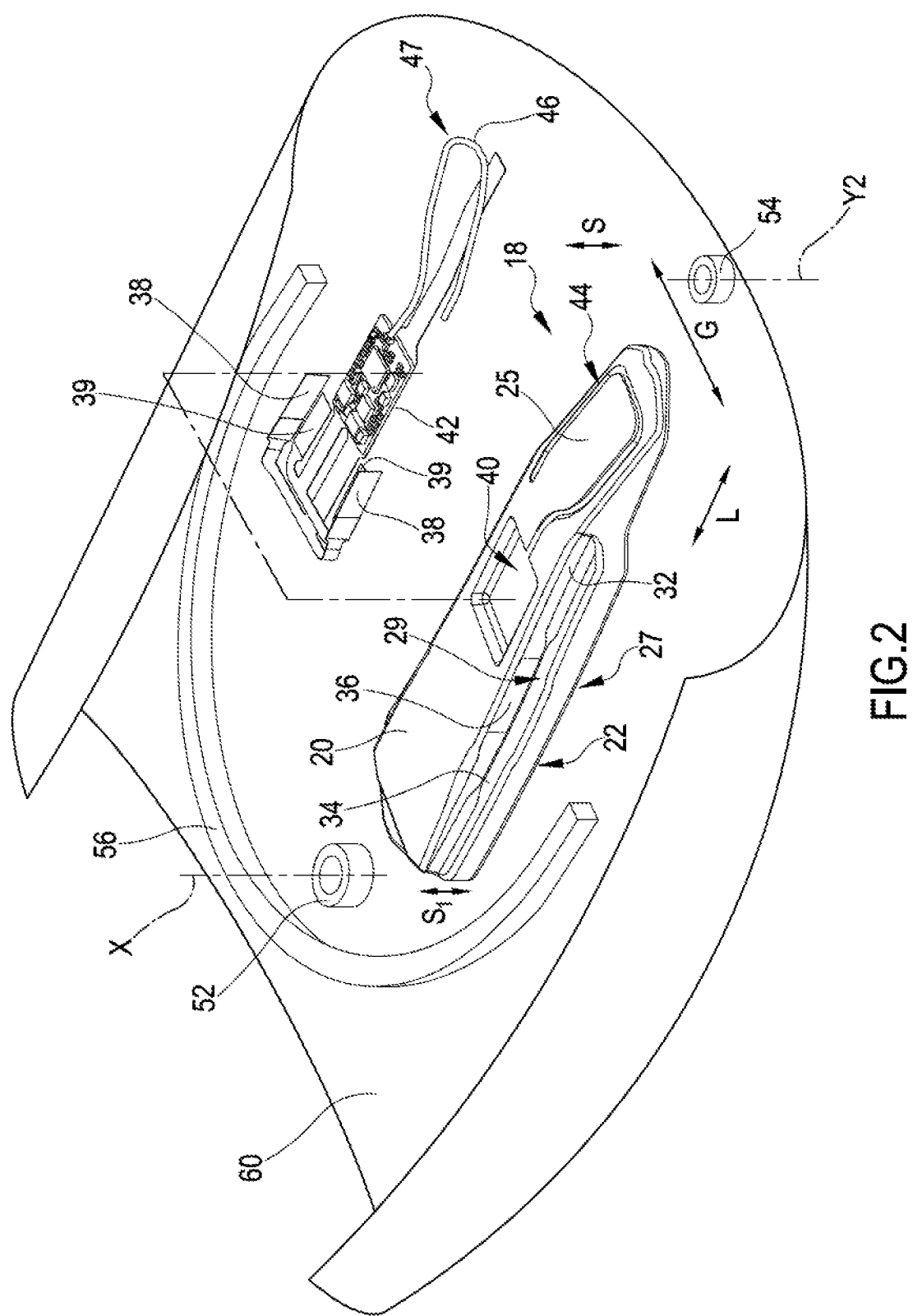
FIGS. 2-3 are perspective and exploded views of steps of a process according to the invention for manufacturing a bicycle component, in particular the crankarm of FIG. 1.
Figure 3:
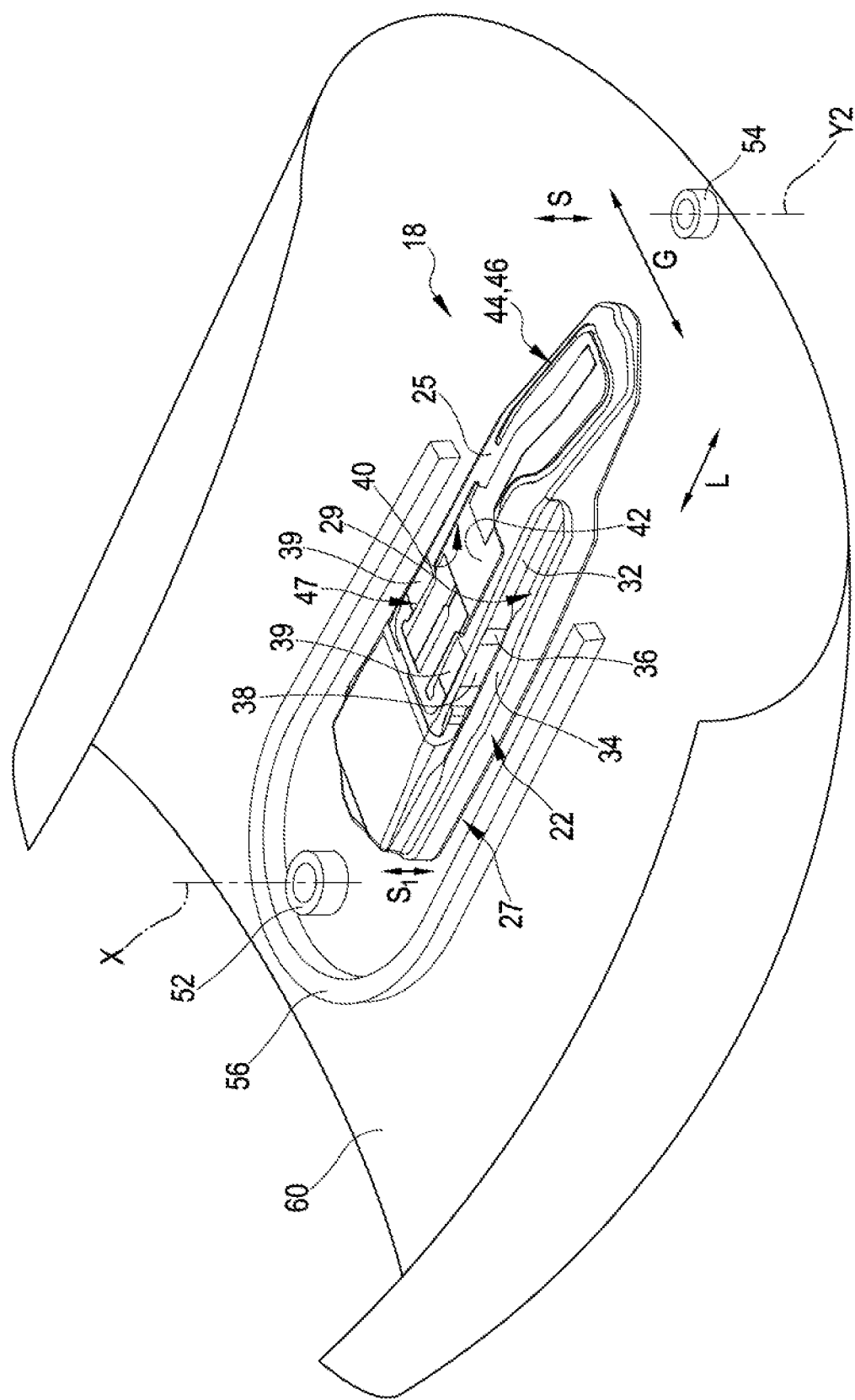

With reference to FIGS. 1 to 3, a hollow crankarm 10 is shown, in the finished state and in some steps of a manufacturing process.

The crankarm 10 is in particular a left crankarm—or more generally on the opposite side to the side of the transmission chain or belt—but what will be described also holds true for a right crankarm—or more generally on the side of the transmission chain or belt—; the changes to be brought about will be clear to those skilled in the art in the light of the present description, and in particular of the following description of FIGS. 4 and 5.

The crankarm 10 has an inner cavity 12 at least in part of an arm region or main body thereof extending between the rotation axis X and the pedal axis Y.

In the present description and in the attached claims, under longitudinal direction or length direction L of the crankarm 10, a direction orthogonally joining the rotation axis X to the pedal axis Y is meant to be indicated.

In the present description and in the attached claims, under width direction G of the crankarm 10, a direction lying in the rotation plane P and orthogonal to the length direction L of the crankarm 10 is meant to be indicated.

In the present description and in the attached claims, under thickness direction S of the crankarm 10, a direction parallel to the rotation axis X is meant to be indicated.

In the present description and in the attached claims, under proximal face 24 of the crankarm 10, the face that, in the mounted condition, faces towards the frame is meant to be indicated; under distal face 26 of the crankarm 10, the face opposite the proximal face 24 is meant to be indicated. The bottom bracket spindle 28 extends transversely from the proximal face 24, and the pedal pivot (not shown) extends transversely from the distal face 26.

In the present description and in the attached claims, in the case of a hollow crankarm 10, under inner surface 14 of the crankarm, the surface facing towards the cavity 12 is meant to be indicated; under outer surface 16 of the crankarm 10, the exposed surface is meant to be indicated.

In order to manufacture the hollow crankarm 10 a shaped rigid core 18 is used, the shape of which determines the shape of the cavity 12 inside the finished crankarm 10.

The expressions "length direction", "width direction", "thickness direction", "proximal face" and "distal face" are used with reference to the core 18 in an analogous way to what has been defined above with reference to the crankarm.

In particular the core 18, at least in a longitudinally central region thereof, has a first region 20 (central in the width direction) that has a maximum thickness S1 (constant or anyway little and steadily variable), and two projections from one side and the other in the width direction G, only one of which, indicated with reference numeral 22, is visible.

Each projection 22 is flush with a face of the core, preferably with the proximal face 27 of the core.

In the transition from each projection 22 to the central region 20, a step 29 is therefore defined, having a riser surface 32 and a "tread" surface 34, preferably orthogonal or approximately orthogonal to one another. The "tread" surface 34 is part of the projection 22 and extends substantially along the length direction L and along the width direction G. The riser surface 32 is part of the central region 30 and extends substantially along the length direction L and along the thickness direction S.

The core 18 comprises grooves and/or recesses intended to house electrical/electronic components in a predetermined and more protected position, like for example integrated circuit boards, flexible circuits and/or connection cables between electronic components internal and/or external to the finished crankarm.

In the case shown there are provided recesses 36 for sensors 38, in particular strain gages or other elongation/contraction sensors and/or temperature sensors, preferably on the riser surfaces 32 of the steps 29, a recess 40 for a printed circuit board or PCB 42, a recess 44 for cables and/or flexible circuits 46, preferably on the distal face 25, a circular recess (not visible) to define the position of an evacuation hole 50 (FIG. 1) described hereinafter, preferably on the proximal face 27.

In the manufacturing process of the hollow crankarm 10, indeed, one or more sensors 38 can first be fixed on the riser surface 32 of the rigid core 18, within the recesses 36. Said cables and/or flexible circuits 46 can also be fixed to the core 18.

The PCB 42, suitably treated as described hereinafter with reference to FIGS. 6-11, is fixed to the core 18, preferably in a stable, but temporary manner, within the recess 40. The meaning of the expression "stable, but temporary" will become clear upon reading the present description.

Advantageously, as shown, the components 38, 42, 46 form a pre-assembled instrumentation body 47; FIG. 3 shows the core 18 and the instrumentation body 47 in the fixing condition of the instrumentation body 47 to the core 18.

The instrumentation body 47 further has sensors 39, preferably temperature sensors when the sensors 38 are strain gages or other elongation/contraction sensors. It should be noted that the sensors 39 of the instrumentation body 47 are fixed on the distal face 25 of the core 18. However, there could be, alternatively or additionally to the recesses 36 on the riser surface 32 of the rigid core 18, recesses on the tread surface 34 of the steps 29 of the core 18 for receiving these sensors 39.

The sensors 38, 39 can also be arranged on the proximal face 27 of the rigid core 18, preferably in recesses (not shown) suitably positioned to receive them.

The elongation/contraction sensors 38 and the temperature sensors 39 could have their positions swapped.

The bottom bracket spindle 28, or a portion thereof, and the pedal pivot (not shown), or corresponding metallic bushes 52, 54, possibly internally threaded, or threaded inserts (masters) for making holes for such spindles/pivots, are positioned at the two ends of the core 18.

Thereinafter, a "cord" of composite material 56 preferably comprising substantially unidirectional structural fiber is positioned in the recess determined by each step 29, wherein the direction of the unidirectional fiber is substantially aligned with the length direction L of the crankarm 10. The cord 56 can be formed of one or more rolled up plies of composite material, or it can comprise a braid or similar of dry unidirectional fiber, which is impregnated with polymeric material prior to the insertion in a mold, or impregnated with polymeric material during molding. A single looped cord 56 can be used, or two cords can be used, each on one side of the core 18. The cord 56 can also be partially hardened.

It should be noted that the sensors 38 are in contact with the cord 56: this can be particularly advantageous when the sensors 38 are strain gages or other elongation/contraction sensors since they turn out to be extended according to the direction of the fibers of the composite material.

Thereafter, one or more other plies 60 of composite material of any of a variety of types are wound on the structure thus prepared.

Like the cord 56, also the plies 60 may or may not be pre-impregnated, in the latter case the polymeric material being subsequently injected into the mold.

Alternatively to the cord 56 and to the plies 60 of composite material, non-ply composite material can be used, as stated above.

The structure is inserted in the mold and the composite material is consolidated, subjecting it to a suitable temperature and pressure profile. The material of the core 18 should be suitably selected so as to withstand the molding pressure and temperature, keeping its shape until hardening of the composite material, still ensuring precise positioning of the sensors 38, 39 (and of the PCB 42) inside the inner cavity 12 of the finished crankarm 10.

After the extraction from the mold, the aforementioned evacuation hole 50 can be made, for example on the proximal face 24 of the crankarm 10, and the core 18 can be suitably melted and allowed to pour out through the hole.

For this purpose, the core 18 is in particular made of a low melting point metallic alloy, the melting point of which is less than 140° C.

The melting process of the alloy takes place in particular—as known for example from document EP1818252A1, incorporated herein by reference—, by placing the semi-finished product in an oil bath at a higher temperature than the melting point of the alloy. In this way, melting of the core 18 takes place without the composite material being damaged by too high temperatures.

The fixing of said one or more sensors 38, 39 to the core 18 should be such as to keep it/them in position during the assembly of the structure to be molded and during molding, but it should have a lower cohesion force than that which is established between said one or more sensors 38, 39 and the composite material, so that, when the core 18 is extracted, the sensors 38, 39 remain fixedly connected to the crankarm.

On the other hand, it is proper for the cables and/or flexible circuits 46, a length of which has to be brought out through the hole 50, not to adhere at all to the crankarm 10, at least at their free end portion.

The fixing of said PCB 42 and/or of the cables and/or flexible circuits 46 to the core 18 should similarly be such as to hold them in position during the assembly of the structure to be molded and during molding, and such that they are not dragged away by the molten core 18 coming out from the hole 50, but on the one hand the same precision of positioning of the sensors 38, 39 is not required, on the other hand it is not strictly necessary for said elements 42, 46 to adhere to the inner surface 14 of the finished crankarm 10—although it is greatly preferred so as to avoid noises and bouncing with consequent manifest problems during the use of the crankarm 10.

However, the preferred configuration of pre-assembled instrumentation body 47 advantageously also makes it easier to keep the various electrical/electronic components in position.

Following the evacuation of the material constituting the core 18, if provided for, the evacuation hole 50 can be suitably plugged, preferably in a tight manner.

The inner cavity 12 of the crankarm 10 thus formed can be finished thereafter by removing the possible metallic residuals remaining after melting through an acid wash, provided that it does not damage the sensor(s) 38, 39.

The crankarm 10 can be subjected to a further finishing cycle of the outer surface 16, for example by subjecting it to sandblasting, and the manufacture ends with the fixing of possible metallic parts provided on the crankarm 10.

In case of the right crankarm, for example, one or more chainrings are fixed, typically by gluing, to a spider thereof. Indeed, in case of a right crankarm, the rigid core, indicated with reference numeral 19 and shown in FIGS. 4-5, is longer than the core 18 and comprises, on the side of the rotation axis X of the finished crankarm, a central hole 57 and projections 58 extending radially around the hole 57, which will define extensions of the inner cavity 12 of the right crankarm inside a corresponding number of spider legs thereof, extending radially around the metallic bush 52. The number of projections 58, respectively spider legs of the crankarm is not necessarily equal to four as shown.

The central region of the core 19 is similar to the central region of the core 18 for the manufacture of a left crankarm, and it is provided with similar conformations, indicated for the sake of convenience with the same reference numerals used to describe the core 18 for the left crankarm of FIGS. 2-3. The electrical/electronic components (PCB 42, sensors 38, 39, cables 46, pre-assembled instrumentation body 47)

are also advantageously analogous to those described for the core 18, and indicated for the sake of convenience with the same reference numerals.

It should be emphasized that, by the manufacturing process illustrated above, the PCB 42 (as well as other electrical/electronic components) is therefore co-molded with the composite material of the crankarm 10, namely the crankarm 10 is molded, as a single piece, with the PCB already inserted thereinside, differently from the prior art wherein first the crankarm is formed and only subsequently are the electrical/electronic components associated therewith.

The crankarm 10 therefore has, integrated in its main body, the PCB 42 and possibly the other electrical/electronic components.

The PCB 42 (and possibly the other electrical/electronic components) is therefore advantageously enclosed in the composite material that forms the crankarm 10, and very well protected thereby against collisions, water, dirt and atmospheric agents.

The electrical/electronic components housed in the crankarm should be such as to withstand the pressure and temperature profile of the molding process—more critical in the case of composite material with thermosetting polymeric material than in the case of composite material with thermoplastic polymeric material—, as well as the acid wash if carried out, possibly when protected as described hereinafter with reference to FIGS. 6-11.

The components that are not capable of withstanding such conditions, and in particular a battery power supply unit, are mechanically connected to the crankarm 10 and electrically connected to the co-molded components only after the molding of the crankarm 10, possibly inserting them into the cavity 12 through the hole 50 or other suitable holes, or fixing them to the outer surface 16 of the crankarm itself.

It is worthwhile emphasizing that the sensors 38, 39 or some of them, can also be connected after the molding of the crankarm 10, and in particular fixed to the outer surface 16 of the crankarm 10.

Alternatively, it is possible to provide a core 18 suitably designed and made to be kept seated, inside the finished crankarm 10, after molding is complete. In this case, it defines anyway a sort of inner cavity, whereby in the present description and in the attached claims, the term inner cavity 12 is meant to indicate the cavity of the composite material forming the shell or outer cladding of the crankarm 10.

The core that stays in the finished crankarm can be provided in a particularly light material, like for example high-density polypropylene or hardened composite material (which may or may not be the same as the composite material forming the shell of the crankarm 10), or in the form of a framework suitably configured for and having such a stiffness as to ensure the correct positioning of the sensors 38, 39 in the finished crankarm.

Figure 4:
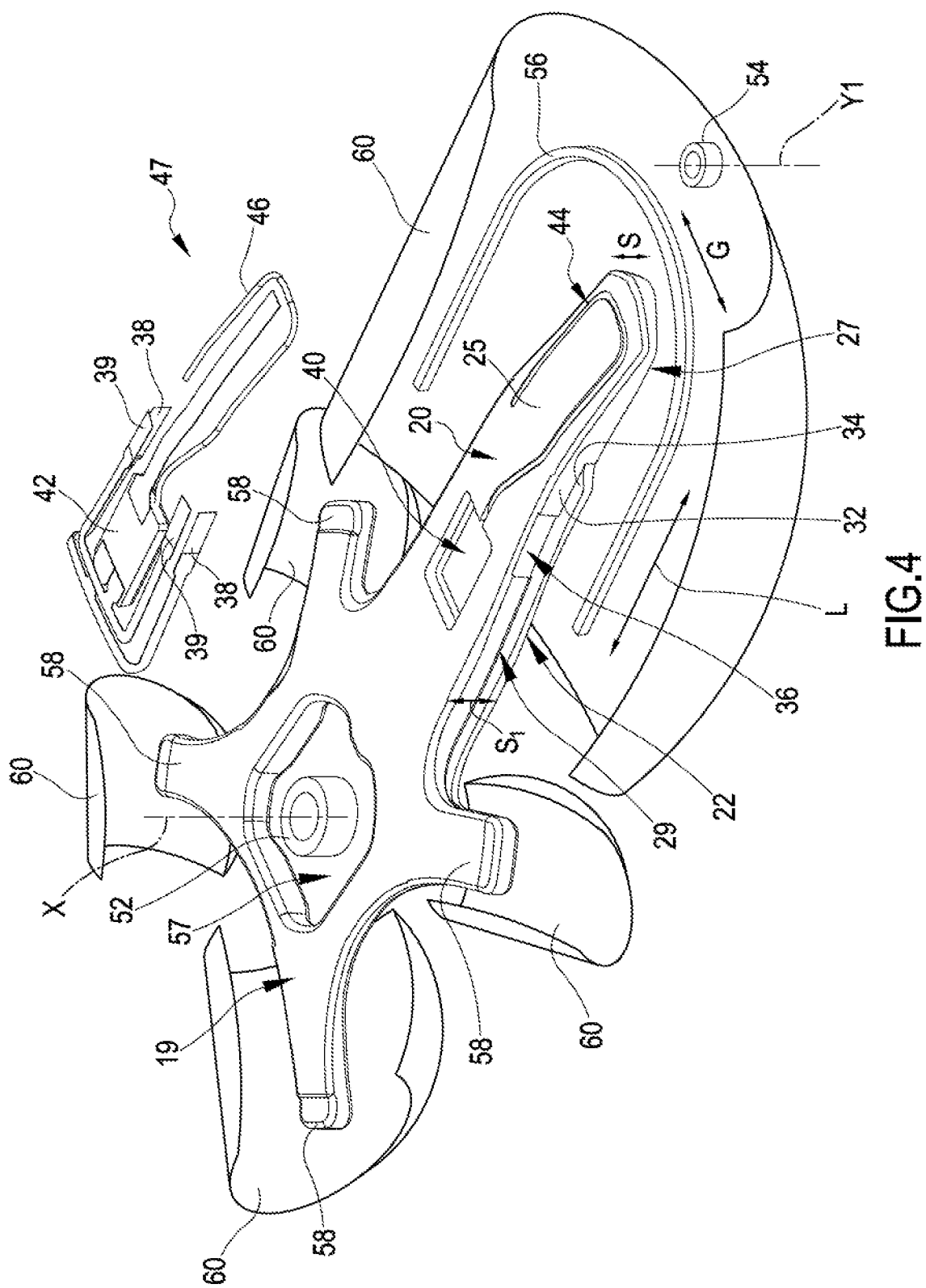
FIGS. 4-5 are views analogous to FIGS. 2-3, relating to the manufacture of a different crankarm.
Figure 5:
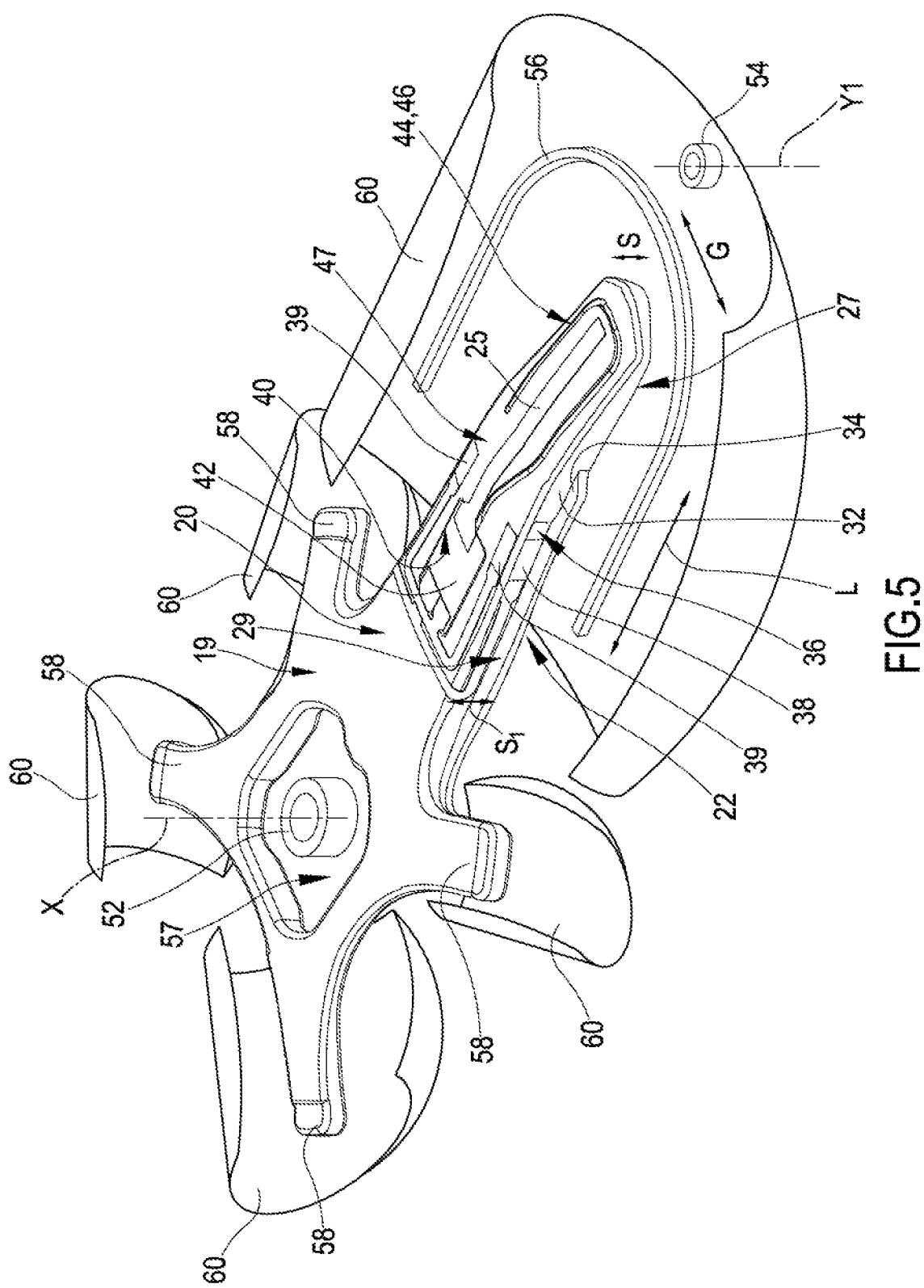

The process for manufacturing the right crankarm according to FIGS. 4-5 is substantially the same as the one described above, apart from the difference in shape and number of plies of composite material 60 that are suitably wound around the core 19, its central hole 57 and its projections 58.

Before molding, the PCB 42 is provided with a protection.

The PCB 42 comprises, in a known manner, a support or substrate, generally comprising at least one conductive layer and one non-conductive layer, preferably an alternation of conductive and non-conductive layers, on which support one or more electrical/electronic components making up a circuit (or plural circuits) are fixed, preferably welded.

The conductive layer(s) is(are) suitably configured, for example through etching, so as to form conductive tracks that mutually interconnect the electrical/electronic components mounted on the support to form the desired circuit and/or pads for connecting the circuit with components external thereto—in the case shown, in particular for the connection of the circuit made on the PCB 42 with the cables 46 for connection with the sensors 38, 39 and with a supply unit external to the crankarm 10.

One or both faces of the support of the PCB 42 can carry the electrical/electronic component(s); one or both faces of the support of the PCB 42 can carry the conductive tracks and/or the pads; in case of a single face carrying the electrical/electronic component(s) and a single face carrying the conductive tracks and/or the pads, it can be the same face or two opposite faces.

The protection of the invention can perform different tasks, alternately or simultaneously.

As far as the conductive tracks and/or the pads are concerned, the protection performs the task of electrically insulating them, particularly in the case in which the face (or the faces) on which they are formed is (are) in contact with conductive material, like for example composite material comprising carbon fiber.

As far as the electrical/electronic component(s) is (are) concerned, the protection performs the task of protecting it or them against the pressures and/or temperatures of molding and/or of other processing steps, in case they are critical—like in particular in the case of compression molding of thermosetting polymeric material.

In both cases, the protection can also perform the task of protecting from chemical agents used in the washing step of the cavity 12.

FIGS. 6-11 illustrate some embodiments of protection of a PCB 42 that allow the co-molding thereof in the crankarm 10 or other bicycle component.

Figure 6:
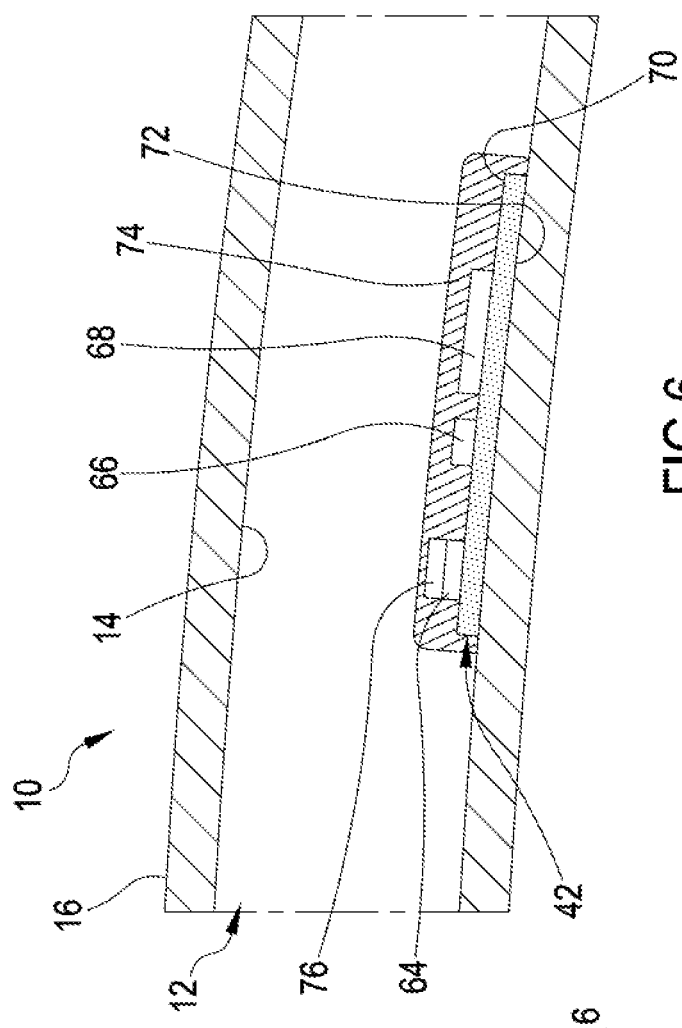
FIGS. 6-9 are partial sectional views of a bicycle component having a hollow section, in particular of a hollow crankarm, according to some embodiments of the invention.

In the embodiment of FIG. 6, the PCB 42 has a plurality of electrical/electronic components (three indicated with reference numerals 64, 66, 68 merely by way of an example) and the tracks and pads on a single face 70 of the PCB. The opposite face 72 of the PCB is formed by a non-conductive layer of its support. The PCB 42 is co-molded in the crankarm 10 with the face 72 in contact with the composite material.

The protection 74 is made of a polymeric material based on a thermosetting epoxy resin, preferably a bi-component one.

The protection 74 thus made ensures resistance to the high molding temperature and melting point of the core 18, 19, besides having a high resistance to impacts and in general to mechanical stresses, in particular to the high molding pressure.

The pressure and/or temperature to which the electrical/electronic components 64, 66, 68 are subjected are advantageously lowered to non-critical levels by the protection 74.

For this purpose it is advantageous that the epoxy-based polymeric material of the protection 74 fills the empty spaces between the electrical/electronic components 64, 66, 68, and compensates for their differences in thickness thereby forming a protected PCB having a uniform thickness, on which the molding pressure is distributed more evenly.

Furthermore, the protection 74 ensures a suitable electrical insulation, even if this is not particularly necessary, since the face 70 of the PCB 42 is exposed to the air within the cavity 12 of the crankarm 10. However, electrical insulation can be useful in the case of water infiltration in the cavity 12.

The protection 74 advantageously also ensures a suitable impermeability and resistance to chemical agents, in particular to the washing acid bath of the manufacturing process.

In order to cover the PCB 42 with the epoxy resin protection 74, the core 18, 19 itself is advantageously—but not necessarily—used. The PCB 42 is arranged in the recess 40 of the core 18, 19 with the face 70 carrying the electrical/electronic components 64, 66, 68 oriented towards the core 18, 19, namely towards the recess 40. The epoxy resin in fluid state is then injected into the recess 40, beneath the PCB 42, and fills the empty spaces between the electrical/electronic components 64, 66, 68 and the bottom of the recess 40. The resin can also be inserted in the recess before the insertion of the PCB 42. The resin is then partially hardened or allowed to harden, thereby forming a stable protection 74.

The electrical/electronic components 64, 66, 68 carried on the PCB 42 thus covered by the protection 74 are therefore advantageously protected both during co-molding, during the course of which the core 18, 19 and the crankarm 10 under formation are subjected to high temperatures and pressures, and during the possible subsequent steps of melting the core 18, 19 and/or of acid washing and finishing, wherein aggressive chemical substances are used, and during the lifetime of the crankarm 10 against possible infiltrations in the cavity 12.

Alternatively to epoxy resin, as indicated in the introductory part of the present description, it is possible to use other materials, mostly polymeric, which have analogous or similar properties, so as to ensure an adequate protection for the PCB 42, like for example methacrylate, polyurethane, an acrylic material.

Some of the electrical/electronic components 64, 66, 68 of the PCB 42 can be further protected against the mechanical stresses involved during molding by adding suitable dampening elements between them and the epoxy resin, like the dampening element 76 shown at the electrical/electronic component 64.

The dampening element 76 has a much lower stiffness than that of the protection 74. In this way, when a mechanical load is applied outside of the protection 74—in particular that caused by the high molding pressure—, the dampening element 76 dissipates the resulting pressure at the underlying electrical/electronic component 64, discharging the load onto the protection portion 74 surrounding the electrical/electronic component 64.

The electrical/electronic component 64 to which the dampening element 76 is applied is for example an accelerometer, which is the component that is most fragile or sensitive to the mechanical loads since its operation is based on mechanical actuators comprising moving microarmatures; the accelerometer is therefore the component that most easily risks being damaged during molding due to the high pressures involved, which can cause small strain onto the PCB 42 that result in the accelerometer microarmatures being damaged.

The electrical/electronic components 66, 68 of the PCB 42 that do not comprise instead moving parts are in general more resistant to mechanical loads, even if they are not designed to have a specific resistance to mechanical loads. It may be appropriate anyway, as a precautionary measure, to provide for further dampening elements analogous to the dampening element 76 also on them.

For the dampening element 76, a silicone polymer is used. Alternatively, other soft polymeric materials can be used, for example polyurethane.

Figure 7:
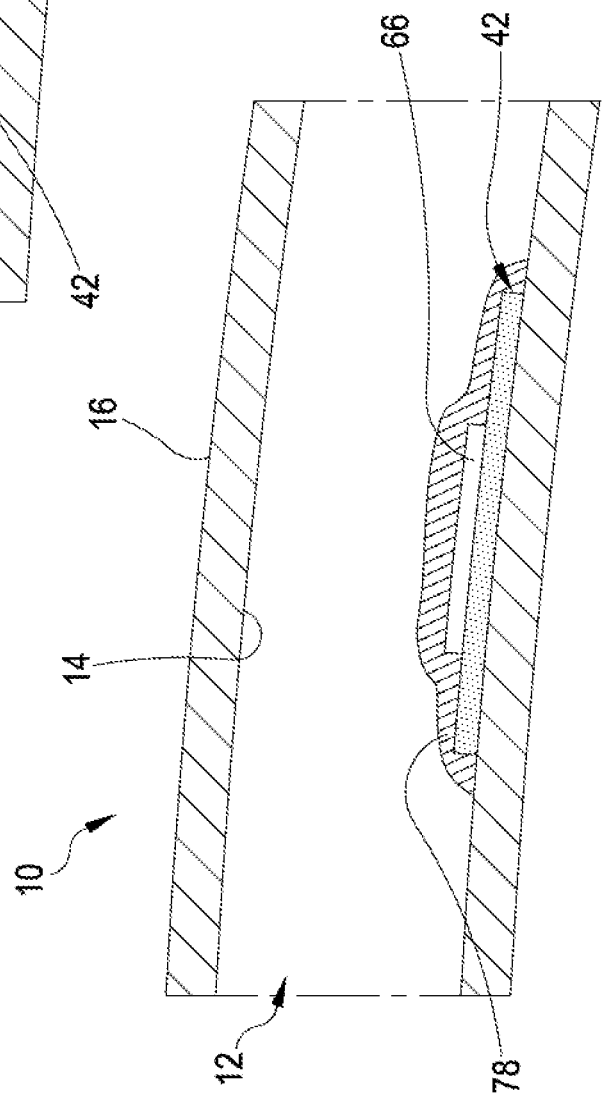

In the embodiment of FIG. 7, the PCB 42 carries one single electrical/electronic component 66, for example a microprocessor, for which reason the problem of different thicknesses and consequent different local pressures does not arise. In this case, the protection 78 is made of a layer, in particular of at least one ply of composite material comprising glass fiber. Despite having inferior mechanical properties than the epoxy resin of the protection 74, the protection 78 ensures comparable characteristics of impermeability, of protection against chemical agents and of electrical insulation.

In the manufacturing process, the ply(ies) of glass fiber composite material can be stably coupled to the PCB 42 outside of the mold, or one or more plies of glass fiber composite material can be first arranged in the recess 40 of the core 18, 19, subsequently arranging the PCB 42 above the plies with the electrical/electronic component 66 arranged towards the glass fiber itself, namely towards the recess 40.

In case the electrical/electronic component 66 carried on the PCB 42 is fragile, it is possible also in this case to provide for a dampening element 76 (FIG. 6) for protection thereof.

Preferably, the polymeric material of the protection 78 is the same as or at least compatible with the polymeric matrix of the composite material of the plies 60, in particular from the chemical point of view and in terms of polymerization or hardening pressure and temperature profile, so that a co-cross-linking or co-hardening of the PCB 42 protected by the protection 78 with the rest of the bicycle component, herein the crankarm 10, takes place.

Alternatively to the glass fiber composite material it is possible to use other electrically insulating materials, which have analogous or similar properties, so as to ensure an adequate protection for the PCB 42, like for example thermoplastic fibers, for example fibers based on nylon or of the Dyneema® type; mineral fibers based on basalt as well as aramid fibers or Zylon® are also suitable.

Figure 8:
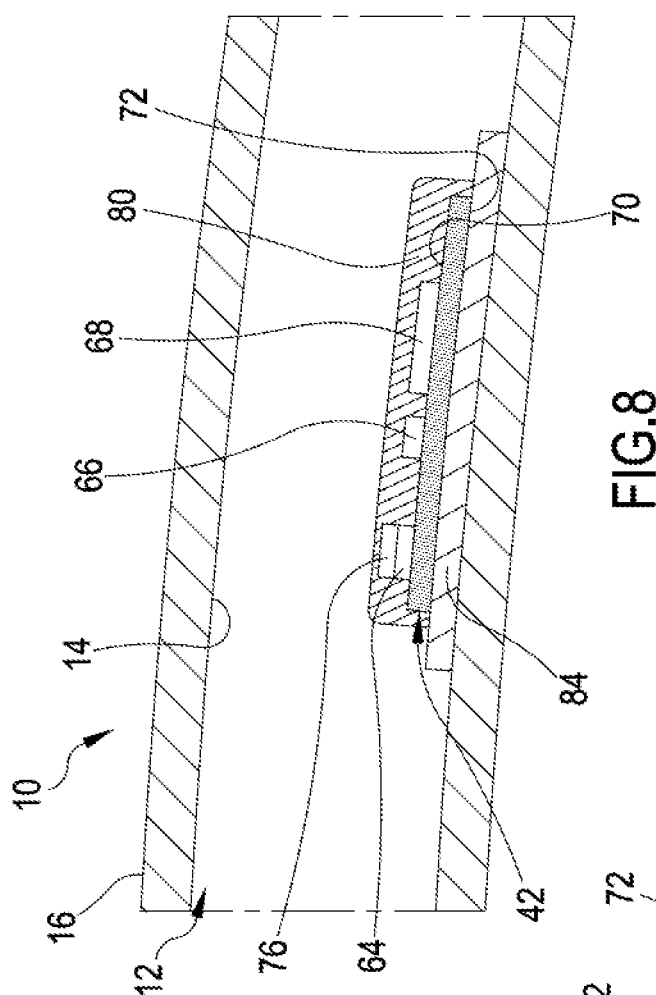

FIG. 8 illustrates a PCB 42 provided with a protection 80 that comprises a layer of epoxy resin, or the variants thereof described above with reference to the protection 74 of FIG. 6, on the side 70 of the PCB 42 carrying the electrical/electronic components 64, 66, 68, and a layer of glass fiber composite material 84 (or other materials indicated above) analogous to the one described with reference to the protection 78 of FIG. 7 on the opposite side 72 of the PCB 42, which in this case has electrical connection tracks and/or pads (not visible). The layer of glass fiber composite material 84 is in this case particularly useful because the side 72 of the PCB 42 carrying the tracks and/or pads would otherwise be in direct contact with the composite material of the crankarm 10, which can be electrically conductive like in the case in which it comprises carbon fiber.

The manufacturing process differs from the one described with reference to FIG. 6 in that the layer of glass fiber composite material 84 is arranged above the PCB 42 after the latter has been inserted in the recess 40 of the core 18, 19, and before wrapping the composite material that will form the crankarm 10.

Figure 9:
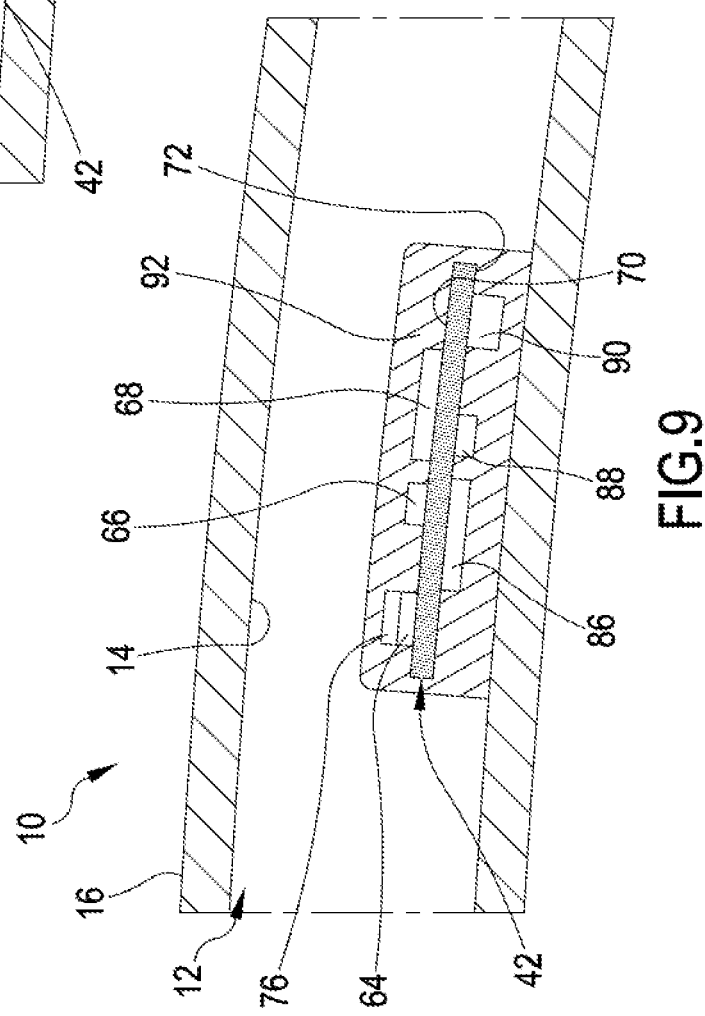

FIG. 9 illustrates a PCB 42 carrying electrical/electronic components 64, 66, 68 on a first face 70 and electrical/electronic components 86, 88, 90 (also in this case, three are shown merely by way of an example) on the opposite face 72. In this case, the protection 92 is made on both faces 70, 72 of epoxy resin or variants as indicated above. The PCB 42 is totally integrated in the epoxy resin of the protection 92. The epoxy resin is preferably injected into the recess 40 before clipping the PCB therein to a certain depth, and pre-hardened before wrapping around the composite material that will form the crankarm 10, in any case before the molding process of the crankarm 10.

It is possible to provide a protection 92 on both sides also for a PCB 42 carrying components on one single face, but tracks and pads on the opposite face.

According to an embodiment that is not shown, it is possible to protect both sides of the PCB 42, in particular if each one carries a single component, through one or more layers of glass fiber composite material or variants as discussed above with reference to FIG. 7.

Also in the embodiments in which the PCB 42 is integrated or completely surrounded by the protection, it is possible to use one or more dampening elements 76 on one or more electrical/electronic components of the PCB 42.

The embodiments in which the PCB 42 is integrated or completely surrounded by the protection achieve the advantages outlined above for the PCB protected on one single face.

Figure 10:
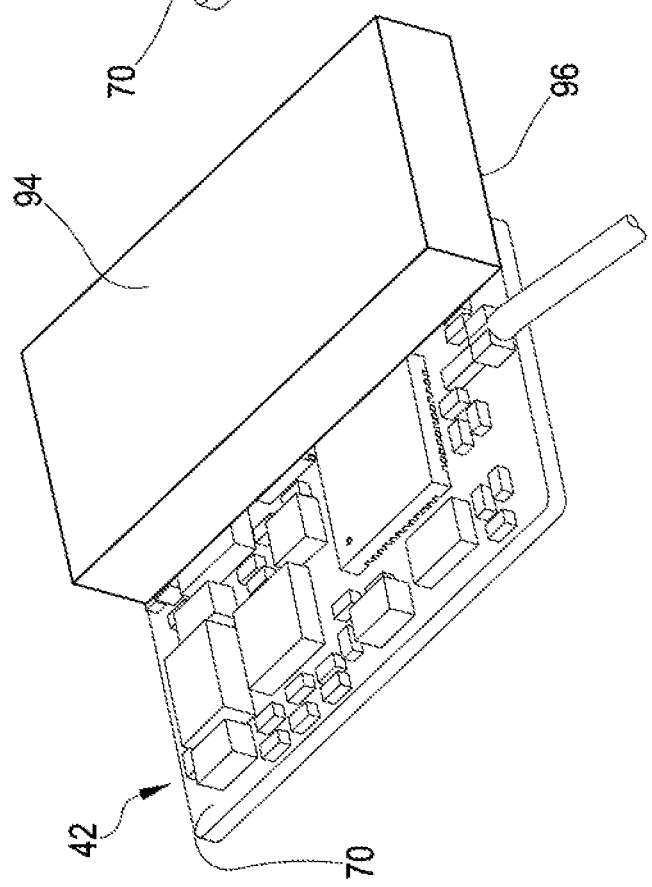

FIG. 10 shows yet an alternative embodiment of a protection 94 applicable to a PCB 42 to allow co-molding thereof with a crankarm 10. In this case various electronic components are visible on the PCB 42, merely as an example.

The protection 94 is made in the form of a cover 94 having a size suitable for covering the face 70 of the PCB 42 carrying the electrical/electronic components, containing them. The cover 94 is made of a material that has suitable characteristics of mechanical resistance, resistance to temperature, resistance to chemical agents and/or electrical insulation for the reasons outlined above, and for this purpose it can be made for example of nylon or ABS.

The cover 94 is in particular made in a shape matching that of the recess 40 on the core 18, 19.

The cover 94 is first fixed, at its edge 96, on the PCB 42, for example by gluing or alternatively by welding. The PCB 42 thus protected by the cover 94 is then inserted into the recess 40 made on the core 18, 19, with the cover 94 in the recess 40.

Figure 11:
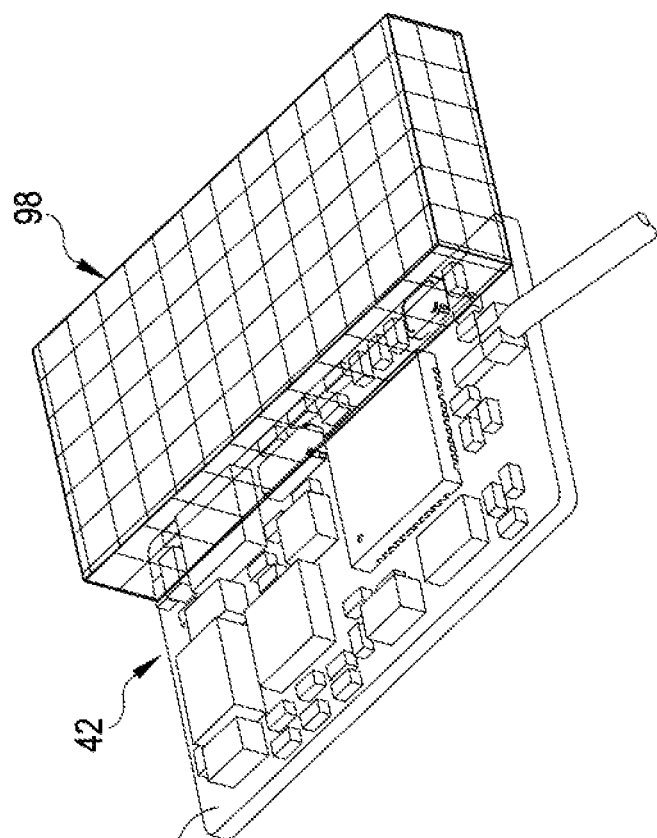
FIGS. 10-11 are perspective views of a detail of a bicycle component according to further embodiments of the invention.

Alternatively to the cover 94 it is possible to provide for a protection framework 98, as shown in FIG. 11, the manufacturing process being analogous to that described with reference to the cover 94 of FIG. 10. The framework 98 can be used in those cases in which it is necessary to protect the electrical/electronic components of the PCB 42 from the mechanical point of view without the need to insulate it completely from the inner cavity of the crankarm. The framework 98 offers mechanical protection and acts as a spacer.

A protection like the cover 94 or the framework 98 can also be provided on both faces of the PCB 42 in case both faces carry electrical/electronic components.

Embodiments in which the two faces of the PCB 42 are protected in two different manners among those described with reference to FIGS. 6, 7, 10, 11 are also possible.

Embodiments in which one and the same or each face of the PCB 42 is protected in two different manners among those described with reference to FIGS. 6, 7, 10, 11 are also possible.

It is again emphasized that the electrical/electronic components carried on the PCB 42 protected with one of the protections discussed above are advantageously protected both during co-molding, during which the core 18, 19 and the crankarm 10 under formation are subjected to high temperatures and pressures, and during the possible subsequent steps of melting the core 18, 19 and/or of acid washing and finishing, in which aggressive chemical substances are used.

Moreover, in the finished crankarm 10 the electrical/electronic components do not result in being exposed inside the cavity 12 and are moreover sealed in a tight manner, protected against a possible entry of water and/or dirt in the cavity 12 of the crankarm 10.

As a further advantage, protecting the board or PCB 42 on both sides, the electrical/electronic components are insulated from the fiber material that, being electrically conductive at least in case of carbon fiber, could interfere with the generation and/or transmission of the electrical signals involved, causing short-circuits and malfunctions.

Finally, since the PCB 42 is totally concealed from view, the appearance of the crankarm 10 is substantially improved.

However, it should be understood that the protection of the PCB 42 can be provided only on the side in contact with the composite material of the crankarm 10 and not on the side exposed inside the cavity 12, or vice-versa.

FIGS. 12-13 illustrate two exemplary embodiments of a protection of a PCB 42 co-molded in a solid crankarm 10.

In this case, both faces of the PCB 42 can be exposed to critical molding pressures and/or temperatures, and/or to the need for electrical insulation from the composite material forming the crankarm 10.

Therefore, unless a face of the PCB 42 lacks both electrical/electronic components and tracks and/or pads, it is appropriate for the PCB 42 to be surrounded on all sides by the protection.

By way of an example, in the case of FIG. 12, the face of the PCB 42 carrying the electronic components 64, 66, 68 is protected by an epoxy resin layer 74 or variants discussed in relation to FIG. 6—and the face of the PCB 42 carrying the tracks and pads is protected by a layer of glass fiber composite material 84—or variants discussed in relation to FIG. 7.

Again by way of an example, in the case of FIG. 13, both faces of the PCB 42 are protected by an epoxy resin layer or variants discussed in relation to FIG. 6.

However, the other embodiments of protection as described above with reference to the hollow crankarm are also possible.

Also in these cases, it is possible to provide for one or more additional dampening elements 76 to protect the most delicate electrical/electronic components 64, 66, 68.

In case of a solid crankarm, it is furthermore possible to use a recess in a suitable support to form the protection outside of the mold; the protected PCB 42 is then covered by layers of composite material before insertion in the mold, or it is inserted in the mold cavity and integrated in non-layered composite material. Finally, the PCB 42 is co-molded with the possible other components and with the composite material forming the crankarm 10.

Although the invention has been described in detail with reference to a crankarm, the invention can also apply to other bicycle components like for example handlebars, frame, or one of the control levers.

The component cross-section can be hollow, respectively solid, only in a region containing the printed circuit board, and solid, respectively hollow, in other regions.

It is also possible to provide for arranging composite material also between the core and the printed circuit board, so as to obtain a component provided with a cavity wherein the printed circuit board is immediately adjacent to the cavity, still being completely surrounded by composite material. If on the one hand this process helps keeping the printed circuit board in position after molding, and to protect it from possible infiltrations in the cavity, on the other hand during molding the printed circuit board can move more than when it is fixed temporarily to the core and/or housed in a recess of the core, so that the positioning of the printed circuit board in the bicycle component is less precise.

Although the invention has been described in detail with reference to a single printed circuit board, it is possible to provide for a greater number of printed circuit boards.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A compression molded monolithic bicycle component that is formed of a composite material comprising structural fiber incorporated in a thermosetting polymeric matrix, and includes a co-molded printed circuit board provided with a protection on at least a first face thereof, wherein said at least one first face of said printed circuit board carries at least one electrical/electronic component and said at least one electrical/electronic component is protected by the protection against a critical temperature and a critical pressure which are reached during a compression molding process for compression molding of the thermosetting polymeric matrix in the molded monolithic bicycle component, and wherein said composite material extends all around said printed circuit board provided with the protection, said composite material being in contact with said printed circuit board provided with the protection on at least one of a side of said first face or on an opposite side.

2. The bicycle component according to claim 1, wherein said critical temperature is at least about 135° C. and said critical pressure is at least about 300 bar.

3. The bicycle component according to claim 2, wherein said protection comprises a layer of a hardened polymeric material.

4. The bicycle component according to claim 3, wherein said at least one first face of said printed circuit board carries a plurality of electrical/electronic components, and said polymeric material fills the spaces between said electrical/electronic components.

5. The bicycle component according to claim 1, wherein said protection is an electrically insulating protection.

6. The bicycle component according to claim 1, wherein said at least one first face of said printed circuit board carries at least one electrical/electronic component, and wherein said protection comprises a cover or a framework that covers said at least one first face, and that contains said at least one electrical/electronic component.

7. The bicycle component according to claim 1, comprising at least one cavity, said printed circuit board provided with the protection being attached to an inner surface of the cavity.

8. The bicycle component according to claim 1, wherein both faces of said printed circuit board provided with the protection are in contact with the thermosetting composite material.

9. The bicycle component according to claim 1, wherein the bicycle component is selected from the group consisting of a crankarm, a handlebar and a control lever.

10. A compression molded monolithic bicycle component formed of a composite material comprising structural fiber incorporated in a thermosetting polymeric matrix, and includes a co-molded printed circuit board carrying at least one electrical/electronic component on at least a first face thereof, said at least one electrical/electronic component being contained within a protecting cover or framework that is fixed along its edges to said printed circuit board and provides at least one of thermal, pressure, or electrically insulating protection to said at least one electrical/electronic component against a critical temperature and a critical pressure which are reached during a compression molding process for compression molding of the thermosetting polymeric matrix, wherein said composite material extends all around said printed circuit board provided with the protection, said composite material in contacts said printed circuit board provided with the protection on at least one of a side of said first face or on an opposite side.

11. A monolithic bicycle component comprised of a composite material having structural fiber incorporated in a thermosetting polymeric matrix, the composite material is around a printed circuit board that carries at least one electrical/electronic component on a first face and is protected on the first face against a critical temperature and a critical pressure for said at least one electrical/electronic component which are reached during compression molding of the thermosetting polymeric matrix in the monolithic bicycle component, wherein said thermosetting composite material is in contact with the protected printed circuit board on a side of at least one of said first face or on a side of a second face opposite to said first face.

* * * * *